United States Patent
Plachetka et al.

(10) Patent No.: US 12,397,246 B2
(45) Date of Patent: Aug. 26, 2025

(54) VACUUM DEGASSING USING ELECTROACTIVE MATERIAL

(71) Applicant: Agilent Technologies, Inc., Santa Clara, CA (US)

(72) Inventors: Clemens Plachetka, Malsch (DE); Tony Ziegler, Steinfeld (DE); Joachim-Richard Wagner, Ettlingen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 228 days.

(21) Appl. No.: 17/539,173

(22) Filed: Nov. 30, 2021

(65) Prior Publication Data
US 2022/0168670 A1 Jun. 2, 2022

(30) Foreign Application Priority Data
Dec. 1, 2020 (GB) .................................... 2018899

(51) Int. Cl.
*B01D 19/00* (2006.01)
*B01D 71/24* (2006.01)
*B01D 71/70* (2006.01)

(52) U.S. Cl.
CPC ..... *B01D 19/0078* (2013.01); *B01D 19/0031* (2013.01); *B01D 71/24* (2013.01); (Continued)

(58) Field of Classification Search
CPC ........ B01D 2313/243; B01D 2259/816; B01D 71/24; B01D 71/70; B01D 19/0078; (Continued)

(56) References Cited

U.S. PATENT DOCUMENTS 5,022,899 A * 6/1991 Hohlfeld ............ B01D 19/0078 96/381
5,183,486 A * 2/1993 Gatten ................... G01N 30/34 73/19.1

(Continued)

FOREIGN PATENT DOCUMENTS

| CN | 205982193 U | 2/2017 |
| JP | H11114308 A | 4/1999 |
| WO | 2010045963 A1 | 4/2010 |

OTHER PUBLICATIONS

Combined Search and Examination Report under Sections 17 and 18(3) dated May 28, 2021 for Application No. GB2018899.1.

*Primary Examiner* — T. Bennett McKenzie

(57) ABSTRACT

A degasser for at least partially degassing a gas-containing liquid, in particular for a sample separation device, includes a liquid accommodation volume for accommodating the gas-containing liquid during degassing, a negative pressure chamber in which a negative pressure, compared to the liquid accommodation volume, is to be generated, a gas permeable membrane separating the liquid accommodation volume from the negative pressure chamber and arranged so that ultrasound forces at least part of gas of the gas-containing liquid to move through the membrane by a combination of the negative pressure and the ultrasound, and an ultrasound source including an electroactive material and configured for generating ultrasound for actuating the gas-containing liquid and/or the gas permeable membrane.

20 Claims, 2 Drawing Sheets

(52) U.S. Cl.
CPC ........ *B01D 71/70* (2013.01); *B01D 2259/816* (2013.01); *B01D 2313/243* (2013.01)

(58) Field of Classification Search
CPC .......... B01D 19/0031; B01D 2313/903; B01D 2315/22; B01D 19/0036; B01D 71/32; B01D 2325/04; B01D 2325/26; B01D 69/02
USPC .................................. 96/6, 175; 95/241–266
See application file for complete search history.

(56) References Cited

U.S. PATENT DOCUMENTS

| | | | |
|---|---|---|---|
| 6,402,821 B1* | 6/2002 | Matsuyama | B01D 19/0005 96/219 |
| 6,664,712 B2 | 12/2003 | Rayner et al. | |
| 2005/0126391 A1* | 6/2005 | Staroselsky | B01D 19/0031 95/30 |
| 2006/0238066 A1 | 10/2006 | Pelrine et al. | |
| 2008/0098894 A1* | 5/2008 | Sabatino | B01D 19/0031 96/6 |
| 2008/0221603 A1* | 9/2008 | Yamada | A61B 17/320068 601/2 |
| 2014/0018766 A1* | 1/2014 | White | A61M 5/14 96/175 |
| 2015/0108871 A1 | 4/2015 | Larsen et al. | |
| 2017/0120164 A1* | 5/2017 | Chen | B01D 19/0063 |
| 2019/0357882 A1* | 11/2019 | Johnson | A61B 8/4281 |

\* cited by examiner

VACUUM DEGASSING USING ELECTROACTIVE MATERIAL

RELATED APPLICATIONS

This application claims priority to UK Application No. GB 2018899.1, filed Dec. 1, 2020, the entire contents of which are incorporated herein by reference.

TECHNICAL FIELD

The present invention relates to degassers for and a method of at least partially degassing a gas-containing liquid, and to a sample separation device.

BACKGROUND

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. This usually occurs in the presence of a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation. As a result, the fluidic sample is injected into the mobile phase, such as a solvent or a solvent composition. It is important for a precise separation of the fluidic sample that the composition of the mobile phase is accurate. For precisely defining the composition and flow rate of the mobile phase and for achieving proper or even optimum detection sensitivity, liquid solvents used for creating the mobile phase can be degassed in a degasser before mixing.

However, the provision of a mobile phase without or with a low amount of gaseous components may be difficult.

SUMMARY

It is an object to degas a liquid at least partially in a simple and efficient way.

According to an exemplary embodiment of a first aspect of the invention, a degasser for at least partially degassing a gas-containing liquid (in particular for a sample separation device) is provided, wherein the degasser comprises a liquid accommodation volume for accommodating the gas-containing liquid during degassing, a negative pressure chamber in which a negative pressure, compared to the liquid accommodation volume, is to be generated, a gas permeable membrane separating the liquid accommodation volume from the negative pressure chamber and arranged so that ultrasound forces at least part of gas of the gas-containing liquid to move through the membrane by a combination of the negative pressure and the ultrasound, and an ultrasound source comprising an electroactive material and being configured for generating ultrasound for actuating the gas-containing liquid and/or the gas permeable membrane.

According to another exemplary embodiment of the first aspect of the invention, a method of at least partially degassing a gas-containing liquid (in particular in a sample separation device) is provided, wherein the method comprises accommodating the gas-containing liquid in a liquid accommodation volume for degassing, generating a negative pressure, compared to the liquid accommodation volume, in a negative pressure chamber, and actuating the gas-containing liquid and/or a gas permeable membrane, which separates the liquid accommodation volume from the negative pressure chamber, by ultrasound generated by an ultrasound source comprising an electroactive material to thereby force at least part of gas of the gas-containing liquid to move through the membrane by a combination of the negative pressure and the ultrasound.

According to an exemplary embodiment of a second aspect of the invention, a degasser for at least partially degassing a gas-containing liquid (in particular for a sample separation device) is provided, wherein the degasser comprises a liquid accommodation volume for accommodating the gas-containing liquid during degassing, a negative pressure chamber in which a negative pressure, compared to the liquid accommodation volume, is to be generated, and a gas permeable membrane separating the liquid accommodation volume from the negative pressure chamber so that at least part of gas of the gas-containing liquid is to move through the membrane by the negative pressure, wherein the gas permeable membrane comprises silicone.

According to another exemplary embodiment, a sample separation device for separating a fluidic sample is provided, wherein the sample separation device comprises a pump for driving a mobile phase and the fluidic sample when injected in the mobile phase, a sample separation unit for separating the fluidic sample in the mobile phase, and a degasser having the above-mentioned features for at least partially degassing a gas-containing liquid, wherein the at least partially degassed gas-containing liquid is supplied for creation of the mobile phase.

In the context of the present application, the term "degasser" may particularly denote a device capable of and configured for at least partially removing gas (especially a dissolved gas) from a liquid. Thus, a degasser may at least partially separate gas from liquid of a liquid-gas composition. An output of the degasser may be a liquid having a smaller amount of gas than a liquid to be degassed and supplied to an input of the degasser.

In the context of the present application, the term "liquid accommodation volume" may particularly denote a volume in which a (in particular gas-containing) liquid may be accommodated, in particular statically or dynamically. For instance, such a liquid accommodation volume may be a volume within a container or a chamber or a conduit.

In the context of the present application, the term "negative pressure" may particularly denote a relative pressure being lower than a pressure in the liquid accommodation volume. In particular, the negative pressure may be an absolute pressure lower than an atmospheric pressure or environmental gas pressure. For instance, the negative pressure may be lower than 1 bar, in particular lower than 100 mbar, more particularly lower than 10 mbar.

In the context of the present application, the term "negative pressure chamber" may particularly denote a volume at a negative pressure which may be evacuated by a vacuum pump, an oscillating membrane in combination with an exhaust valve, or the like.

In the context of the present application, the term "gas permeable membrane" may particularly denote a thin film which can be passed by gaseous components, but which may be impermeable for liquids.

In the context of the present application, the term "membrane being actuable by ultrasound" may particularly denote a thin film which may be sufficiently elastic so that it can move or oscillate when being excited by ultrasound. For instance, such a membrane may be made of a TEFLON material, or preferably a silicone such as fluorosilicone. The membrane may be an elastomer membrane.

In the context of the present application, the term "ultrasound source" may particularly denote an emitter of ultrasonic waves. Ultrasound may be sound waves with frequencies higher than the upper audible limit of human hearing. Correspondingly, the ultrasound source may operate with frequencies of at least 20 kHz, in particular from 20 kHz up to 5 GHz.

In the context of the present application, the term "electroactive material" may particularly denote a material which exhibits a change in size or shape when stimulated by an electric field. Preferably, such an electroactive material may be an electroactive polymer (EAP). Advantageously, such an electroactive material may be configured as actuator and/or sensor. An advantageous property of an EAP is that it may undergo a large amount of deformation while sustaining large forces.

In the context of the present application, the term "silicone" or polysiloxane may particularly denote polymers made up of siloxane and may be a rubber-like substance. Preferably, the silicone may be fluorosilicone (for instance fluoroalkylsilicone, fluoro-vinyl-methyl-silicone, etc.). Other examples are methyl silicone, vinyl methyl silicone, phenyl-vinyl-methyl-silicone, phenyl-modified silicone, etc. Advantageously, silicone has a high durability and a high resistance. Especially in the temperature range from −20° C. to 120° C., the Young's modulus is quite independent from temperature variations. Hence the operation is not influenced by temperature dependent changes of stiffnesses. The electroactive polymer based device may be actuator and sensor at the same time which is one of its major advantages over conventional technologies.

In the context of the present application, the term "sample separation device" may particularly denote a device capable of and configured for separating a fluidic sample into different fractions. For instance, sample separation may be accomplished using chromatography or electrophoresis.

According to an exemplary embodiment of the first aspect of the invention, a degasser is provided which is configured for efficiently degassing a gas-containing liquid. For this purpose, the gas-containing liquid is not only made subject to a vacuum degassing procedure, but is additionally subjected to ultrasound. By synergistically combining vacuum degassing with an ultrasound degassing trigger or promoter, a degassing efficiency may be improved. Advantageously, the degasser may be configured for a combined vacuum degassing using a gas-liquid separation membrane and degassing by ultrasonic sound for triggering to outgas the gas contained in the liquid. Highly advantageously, ultrasound for triggering degassing in combination with the degassing effect of a vacuum may be created by ultrasound source making use of an electroactive material. Descriptively speaking, the electroactive material may be excited by applying an electric voltage for being deformed, which may trigger the generation of ultrasound waves in the degasser. Using such an electroactive material for ultrasonic wave creation in a degasser may result in a high degassing performance with a low effort and compact design. An advantage of implementing an electroactive polymer in a degasser for generating ultrasound is its capability of being deformed to a large degree while sustaining large forces, thereby being highly robust even under harsh conditions and simultaneously allowing for a high degassing performance.

According to an exemplary embodiment of the second aspect of the invention (which may or may not be combined with an embodiment according to the first aspect), a vacuum degasser may be provided which comprises a permeable silicone membrane. Highly advantageously, such a silicone membrane offers a high permeability for gas with a pronounced selectivity in terms of impermeability for liquids. Moreover, a silicone membrane can be manufactured sufficiently thin for being properly deformable by ultrasound, so that a silicone membrane may be also of utmost advantage for a combined vacuum-ultrasound degasser. At the same time, silicone is highly durable and robust so that it can even cope with harsh conditions, such as the presence of aggressive chemicals in a sample separation device.

In the following, further embodiments of the degassers, the sample separation device, and the method will be explained.

In an embodiment, the degasser is configured so that the gas-containing liquid and/or the gas permeable membrane is or are to be actuated by ultrasound to force at least part of gas of the gas-containing liquid to move through the membrane by a combination of the negative pressure and the ultrasound, wherein the degasser comprises an ultrasound source, in particular comprising an electroactive material, being configured for generating ultrasound for actuating the gas-containing liquid and/or the gas permeable membrane. In particular, the ultrasound activation may be subjected to the liquid in order to mechanically induce separation of gas bubbles from the liquid. Hence, it is not necessarily the membrane which needs to be actuated by ultrasound, even though that this may also be the case. In short, the ultrasound source may be for activating separation of gas bubbles from the liquid. This may be accomplished by ultrasound-activation of the gas containing liquid and/or of the gas permeable membrane.

In an embodiment, the ultrasound source is integrally formed with the gas permeable membrane. Integrating the ultrasonic source with the gas permeable membrane may allow for a highly compact arrangement of ultrasound source and membrane. Due to a resulting close spatial relationship between ultrasound source and membrane, the membrane may be highly efficiently triggered to move (in particular to oscillate) under the impact of ultrasonic waves, thereby efficiently stimulating gas bubbles to be separated from the liquid and to move away from the liquid through the vacuum-subjected and ultrasound-excited membrane.

In an embodiment, the ultrasound source and the gas permeable membrane are formed as a stack, in particular a layer stack composed of interconnected layers. More specifically, the ultrasound source and the permeable membrane may be stacked on top of each other to form a common, for instance integrally connected, stack. For instance, the ultrasound source may be formed as a layer sequence composed of a central electroactive layer or structure cladded with electrodes on opposing main surfaces. Such a (in particular three-) layer stack may then be connected with a layer-type membrane, optionally with one or more further layers in between and/or attached exteriorly.

In an embodiment, the stack comprises a permeable, in particular porous, spacer layer between the gas permeable membrane and the ultrasound source. Such a porous spacer layer may ensure a proper permeability of the membrane for gas which might be compromised locally when the gas permeable membrane is directly arranged on a (for instance gas impermeable) electrode of the ultrasound source.

In another embodiment, the ultrasound source and the gas permeable membrane are formed as a patterned ultrasonic source sheet having one or more through holes filled at least partially with one connected or multiple separate sections of gas permeable material. In other words, the ultrasound source and the gas permeable membrane, being integrally formed, may be formed as a patterned ultrasonic source sheet having one or more through holes filled partially or entirely with one connected or multiple island-shaped sections of the gas permeable membrane. Such a configuration is not only highly compact in particular in a vertical direction, but also offers excellent properties in terms of functional interaction between ultrasound source and the gas permeable membrane for efficiently triggering degassing.

In an embodiment, the degasser comprises a sealing structure sealing the ultrasound source with regard to the gas permeable membrane. The sealing structure may be arranged on the ultrasound source at a top side and at a bottom side of the ultrasound source (in particular when the ultrasound source and the gas permeable membrane are formed as parts of a common stack). Alternatively, the sealing structure may be arranged circumferentially on a surface of the ultrasound source (in particular when the ultrasound source and the gas permeable membrane are formed as parts of a common layer with a patterned sheet constituting the ultrasound source, and one or more gas permeable elastic inlays in through holes of the sheet). Referring to the above embodiment with a stack, the latter may comprise a sealing structure sealing the ultrasound source, in particular one sealing layer on a top side and another sealing layer on a bottom side. Referring to the of the above-described embodiment with a patterned sheet, the latter may comprise a sealing structure covering upper, lower and lateral surface portions of the ultrasound source sheet. For example, such a sealing structure may be made of an inert plastic, such as polyetheretherketone (PEEK) or polytetrafluoroethylene (PTFE, e.g., a TEFLON material), for avoiding a direct contact between for example different poorly compatible materials of the stack by physically spacing such materials by a respective sealing structure. Hence, the sealing structure may function for shielding materials of the stack from each other. In particular, the sealing structure may be embodied as two sealing layers enclosing the ultrasound source both at a top side and a bottom side thereof.

In yet another embodiment, the ultrasound source and the gas permeable membrane are formed as separate members. Hence, ultrasound source and gas permeable membrane may be spatially decoupled from each other while being functionally coupled. The opportunity to spatially separate ultrasound source and gas permeable membrane further increases the freedom of design and promotes a free deformability of the membrane.

In an embodiment, the ultrasound source is arranged in a wall which delimits at least part of the negative pressure chamber. This may allow for a simple mounting of the ultrasound source and for easily supplying an exciting electric voltage from a voltage source positioned at an exterior of the wall.

In an embodiment, the degasser may comprise a negative pressure source (such as a vacuum pump) configured for generating the negative pressure in the negative pressure chamber. For instance, the negative pressure may be below ambient pressure, in particular below 100 mbar, in particular below 10 mbar. For instance, the negative pressure source may be a vacuum pump connected for gas exchange with a wall delimiting the negative pressure chamber.

In an embodiment, the negative pressure source is integrally formed with the ultrasound source, in particular in a wall which delimits at least part of the negative pressure chamber. Highly advantageously, the oscillating electroactive polymer of the ultrasound source creating ultrasonic waves by oscillating may simultaneously function as a membrane pump, evacuating the negative pressure chamber. For example, such an electroactive material may oscillate with a stroke of at least 1 µm and may thereby generate pressurized gas pulses which may be ejected out of the negative pressure chamber through a check valve connecting the negative pressure chamber with an exhaust. Integrally forming negative pressure source and ultrasonic source may further reduce the space consumption of the degasser.

In an embodiment, the degasser may comprise a pressure sensor for sensing a pressure in the degasser, in particular for sensing a pressure in the negative pressure chamber. Measuring the pressure in the negative pressure chamber by a pressure sensor may deliver meaningful information about the vacuum level in the negative pressure chamber and thus about the degassing performance. For instance, such pressure information may be used for controlling operation of the degasser, and in particular of the negative pressure source. The pressure in the negative pressure chamber may also correlate with the degassing efficiency.

In an embodiment, the pressure sensor is integrally formed with one of the ultrasound source and the gas permeable membrane. Advantageously, the pressure detecting function may be provided based on the electroactive material of the ultrasound source. Depending on the value of the negative pressure in the negative pressure chamber, the electroactive material will be deformed to a characteristic degree which may be measured for instance via the electrodes covering the electroactive material of the ultrasound source for ultrasonic sound excitation purposes. In a pressure detection mode, a change of the capacitance of a capacitor formed by the dielectric deformable electroactive material in combination with the electrodes due to a pressure-dependent deformation of the electroactive material may be detected for deriving pressure information. During operation of the degasser, also the gas permeable membrane may be deformed when being excited with ultrasonic waves. When applying electrodes on the gas permeable membrane (which may for instance be formed by a dielectric elastomer), a pressure measurement may be possible since the pressure value in the negative pressure chamber may characteristically influence a deformation of the gas permeable membrane in accordance with a pressure difference between liquid accommodation volume and negative pressure chamber. Both described configurations may render a separate pressure sensor dispensable and may thereby contribute to the compactness of the degasser.

In an embodiment, the liquid accommodation volume comprises at least one liquid channel, in particular a plurality of liquid channels, through which the gas-containing liquid is drivable, is pumpable, is guidable or may flow during degassing. For example, each of a plurality of liquid solvents (for instance an organic solvent such as methanol and an inorganic solvent such as water) used for mixing a solvent mixture with precisely defined composition for use as a mobile phase during sample separation may be degassed individually before proportioning and mixing. For this purpose, each solvent container may be fluidically connected with a respective one of the liquid channels for being degassed simultaneously and on-the-fly all in the same degasser. This renders the degasser of a multi-solvent sample separation device simple and compact. Alternatively, it is also possible to degas an already mixed solvent composition.

In particular, the gas permeable membrane may be impermeable for liquid. This ensures a proper separation of liquid and gas via the ultrasound-activated vacuum-driven membrane and thus an efficient degassing.

In an embodiment, at least one of the electroactive material and the gas permeable membrane comprises a silicone, in particular fluorosilicone. Fluorosilicones are a class of polymers generally composed of siloxane backbone polymers and fluorocarbon pendant groups. One example for an appropriate fluorosilicone usable according to exemplary embodiments of the invention is poly(3,3,3-trifluoropropyl) methylsiloxane. Fluorosilicone materials have excellent properties for implementation in a degasser, such as high thermal stability, good chemical and environmental resistance, and surface characteristics, and also show a pronounced electroactive behavior. Furthermore, fluorosilicone may be formed as a thin membrane and has advantageous properties in terms of gas permeability and liquid impermeability. Hence, fluorosilicone is both highly appropriate as electroactive material of the ultrasound source as well as a material for the gas permeable membrane.

In an embodiment, the gas permeable membrane comprises a supporting grid. Such a grid may stabilize the membrane for preventing it from excessively deforming or even collapsing in the event of a high pressure difference between negative pressure chamber and liquid accommodation volume. As a result, the degasser may be operated also with a high degassing performance requiring a sufficient vacuum in the negative pressure chamber.

Additionally or alternatively, the degasser may comprise a support structure on which the gas permeable membrane is mounted for maintaining at least a predefined minimum volume of the liquid accommodation volume. By taking this measure it can be ensured that even in the event of a large pressure difference between negative pressure chamber and liquid accommodation volume, the degasser remains physically stable and allows for a continuous flow of gas-containing liquid through fluid channels of the degasser. In particular, this may efficiently suppress or even eliminate the risk of a blockage of the gas chamber caused by an excessively elongated membrane, since the support structure may always maintain a minimum distance between membrane and bottom of the liquid accommodation volume, in particular fluid channels thereof.

Advantageously, the electroactive material may be configured to act as sensor and actuator simultaneously. For instance, the electroactive material may act as a sensor for sensing a pressure. At the same time, the electroactive material may function as an actuator, for instance for generating ultrasound.

In an embodiment, the gas permeable membrane (in particular when made of a silicone such as fluorosilicone) has a thickness in a range from 1 µm to 1 mm, preferably in a range from 10 µm to 100 µm. Thus, the thickness may be sufficiently small for allowing an efficient transition of gas through the membrane as well as an efficient excitation of the membrane by ultrasound, and may be sufficiently large for ensuring a sufficient rigidity and mechanical robustness of the membrane.

In an embodiment, the gas permeable membrane and the electroactive material are made of the same material, in particular a silicone such as fluorosilicone. By reducing the number of materials used for constructing the degasser, the manufacturing effort may be kept small. Furthermore, the risk of an incompatibility between different materials may be reduced by taking this measure.

Embodiments of the above described degasser may be implemented in conventionally available HPLC systems, such as the Agilent 700 (or 1290) Series Rapid Resolution LC system or the Agilent 1150 HPLC series (both provided by the applicant Agilent Technologies—see www.agilent.com).

One embodiment of a sample separation device comprises a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The separation unit of the sample separation device preferably comprises a chromatographic column (see for instance the Wikipedia article at en.wikipedia.org/wiki/Column_chromatography) providing a stationary phase. The column may be a glass or steel tube (for instance with a diameter from 50 µm to 5 mm and a length of 1 cm to 1 m) or a microfluidic column (as disclosed for instance in EP 1577012 or the Agilent 700 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent), which can be created based on the degassed liquid, can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the pump, in the mobile phase may range from 2-200 MPa (20 to 2000 bar), in particular 10-150 MPa (150 to 1500 bar), and more particularly 50-70 MPa (500 to 700 bar).

The sample separation device, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 700 Series Rapid Resolution LC system or the Agilent 1150 HPLC series, both provided by the applicant Agilent Technologies, under www.agilent.com.

Embodiments of the invention can be partly or entirely embodied or supported by one or more suitable software programs, which can be stored on or otherwise provided by any kind of data carrier, and which might be executed in or by any suitable data processing unit. Software programs or routines can be preferably applied in or by the control unit.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
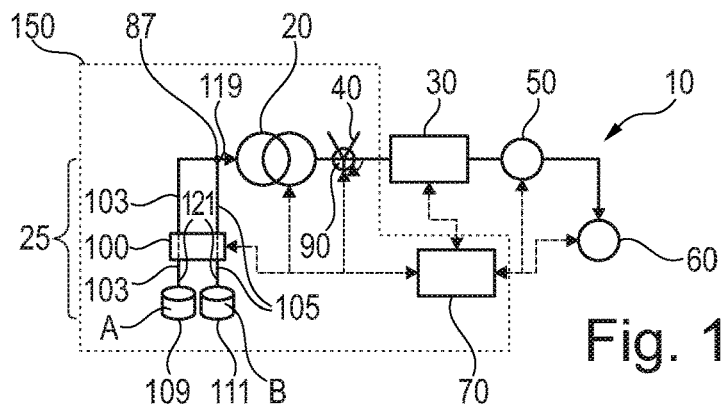
FIG. 1 shows a liquid sample separation device in accordance with embodiments of the present invention, particularly used in high performance liquid chromatography (HPLC).

The illustration in the drawings are schematic.

DETAILED DESCRIPTION

Before describing the figures in further detail, some basic considerations of the present invention will be summarized based on which exemplary embodiments have been developed.

For degassing of solvent, thermal degassing is conventionally applied. For thermal degassing, solvent may be heated up to the boiling point which leads to a reduced solubility of gas. A disadvantage of such an approach is that it may be undesired to have boiling solvents, because this may be dangerous.

Another conventional alternative is chemical degassing. In this context, special chemicals are added to the solvent which is to be degassed. However, pure solvents may be strongly preferred in mobile phase-based sample separation technologies such as HPLC applications.

Still another option of degassing is ultrasonic degassing. Sound may be excited with an ultrasonic frequency which leads to degassing of the solvent.

Yet another way of degassing is vacuum degassing. By vacuum degassing, liquid may be separated from a vacuum chamber by a gas-permeable membrane. Gas permeates through the membrane from the solvent into the vacuum chamber.

According to an exemplary embodiment of a first aspect of the invention, a degasser for degassing a gas-containing liquid is provided which boosts the degassing function by combining vacuum degassing with ultrasound-enhanced degassing. Such a degasser may be implemented particularly advantageously in a sample separation device such as a liquid chromatography device, more particularly an HPLC (high performance liquid chromatography) device. Ultrasound generation may be accomplished in a simple, compact and efficient way by the use of an electroactive material for the construction of the ultrasound source.

In particular, an exemplary embodiment combines a vacuum-based degasser with an electroactive ultrasonic degassing promoter. In particular, an electroactive polymer-based ultrasonic source may be integrated in a gas permeable membrane for achieving a pronounced compactness. Hence, an ultrasonic transducer may generate ultrasound by an electroactive layer. Ultrasonic enhancing degassing may for instance be applied indirectly onto the liquid, for instance the ultrasonic waves may be applied to an evacuated chamber and may propagate from there to the membrane being functionally coupled with the gas-containing liquid to be degassed. Alternatively, ultrasonic waves may be applied directly onto the liquid by integrally forming the gas permeable membrane and the ultrasound source. An electroactive polymer layer may be implemented in the degasser for operating as a sensor, in particular as a pressure sensor. A dielectric elastomer may be used for a gas permeable membrane and/or in an ultrasound source of a degasser according to an exemplary embodiment.

More specifically, an exemplary embodiment of the invention provides a vacuum degasser in which a core of an ultrasonic source is built of fluorosilicone. As said material is a dielectric elastomer, it can function as an ultrasonic source itself. Furthermore, also a gas permeable membrane may comprise fluorosilicone. Fluorosilicone can also be used for a direct pressure measurement in a degasser, in particular in a negative pressure chamber thereof. Preferably, an exemplary embodiment may combine an ultrasonic degasser and a vacuum degasser. Optionally, a pressure sensor may be implemented as well, in particular in a gas permeable membrane and/or in an ultrasound source, wherein sensor data may be supplied to a control unit via a control loop for controlling the degasser. An integrated ultrasonic actor and pressure sensor may be integrated directly into the degasser, which may lead to a greater performance and a reduced manufacturing effort.

According to an exemplary embodiment of a second aspect of the invention, a vacuum degasser for degassing a gas-containing liquid by selective gas diffusion through a gas permeable membrane into a vacuum chamber is provided which uses a silicone material for constructing the membrane. Such a silicone material, in particular fluorosilicone, may be manufactured with sufficiently small thickness promoting gas permeability while simultaneously ensuring a sufficient robustness of the membrane even in the presence of a high pressure difference between the opposing membrane sides. Moreover, a silicone membrane may be both deformable and durable. Advantageously but not necessarily, the high deformation capability of a silicone membrane enables to synergistically combine vacuum degassing with an additional ultrasound trigger rendering vacuum degassing much more efficient.

Referring now in greater detail to the drawings, FIG. 1 depicts a general schematic of a liquid separation system as example for a sample separation device 10 according to an exemplary embodiment of the invention. A pump 20 receives a mobile phase from a solvent supply 25 via a degasser 100, which degases and thus reduces the amount of dissolved gases in the mobile phase. Exemplary embodiments of the degasser 100 are shown in FIG. 2 to FIG. 8 and will be described below in further detail. The mobile phase pump 20 drives the mobile phase through a separation unit 30 (such as a chromatographic column) comprising a stationary phase. A sampler or injector 40, implementing a fluidic valve 90, can be provided between the pump 20 and the separation unit 30 in order to subject or add (often referred to as sample introduction) a sample fluid into the mobile phase so that a mixture of fluidic sample and mobile phase may be provided towards a separation path where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the pump 20, so that the pump 20 already receives and pumps the mixed solvents as the mobile phase. Alternatively, the pump 20 may comprise plural individual pumping units, with plural of the pumping units each receiving and pumping a different solvent or mixture, so that the mixing of the mobile phase (as received by the separation unit 30) occurs at high pressure and downstream of the pump 20 (or as part thereof). The composition of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the devices in the sample separation device 10 in order to receive information and/or control operation. For example, the control unit 70 may control operation of the pump 20 (for example setting control parameters) and receive therefrom information regarding the actual working conditions (such as output pressure, etc. at an outlet of the pump 20). The control unit 70 may also control operation of the solvent supply 25 (for example setting the solvent/s or solvent mixture to be supplied), and in particular of the degasser 100 (for example setting control parameters and/or transmitting control commands to any of the components shown in FIG. 2 to FIG. 8) and may receive therefrom information regarding the actual working conditions (such as solvent composition supplied over time, vacuum level, etc.). The control unit 70 may further control operation of the sampling unit or injector 40 (for example controlling sample injection or synchronization of sample injection with operating conditions of the pump 20). The separation unit 30 may also be controlled by the control unit 70 (for example selecting a specific flow path or column, setting operation temperature, etc.), and send—in return—information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detector 50) and provide data back.

FIG. 1 also shows a liquid supply device 150 configured for metering liquids in controlled proportions and for supplying a resultant mixture as mobile phase. The liquid supply device 150 comprises in the shown example two reservoirs 109, 111 each containing a respective solvent component A (in this example water), B (in this example a buffer, i.e. salt dissolved in a solvent) both constituting a gas-containing liquid 121 to be at least partially degassed by degasser 100. Moreover, it is possible to provide one or more additional reservoirs, for instance an additional reservoir comprising an organic solvent, a further reservoir comprising an optional organic modifier, etc. (not shown). Each of the reservoirs 109, 111 is fluidically connected via a respective liquid supply line 103, 105 and via the degasser 100 with a proportioning unit 87 which may be configured as proportioning valve. The proportioning unit 87 is configured to connect a selected one of the liquid supply lines 103, 105 with a supply line or conduit 119 guiding towards the pump 20, and to switch between different liquid supply lines 103, 105. The supply line or conduit 119 is connected with an inlet of the pump 20. Hence, solvent blending is performed at the low-pressure side of the pump 20 by metering or proportioning a sequence of fluidic portions.

Figure 2:
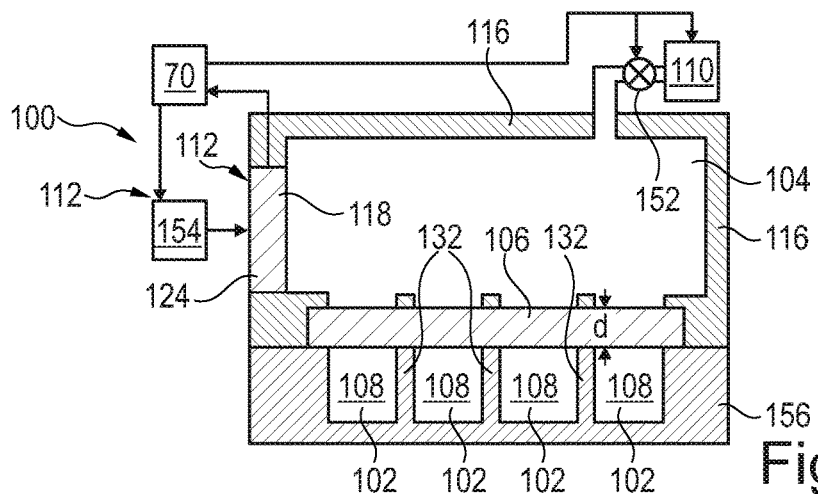
FIG. 2 shows a degasser according to an exemplary embodiment of the invention.

FIG. 2 to FIG. 8, which will be described in the following in detail, show exemplary embodiments for degasser 100 according to FIG. 1:

FIG. 2 shows a degasser 100 according to an exemplary embodiment of the invention.

The degasser 100 according to FIG. 2 serves for degassing a gas-containing liquid 121 and may be implemented in a sample separation device 10, such as the one shown in FIG. 1.

As shown in FIG. 2, the degasser 100 comprises a liquid accommodation volume 102 for accommodating the gas-containing liquid 121 to be degassed during degassing. In particular, the gas-containing liquid 121 may flow through the liquid accommodation volume 102 while being degassed. As shown, the liquid accommodation volume 102 may comprise a plurality of liquid channels 108 through which the gas-containing liquid 121 is drivable during degassing. Referring again to FIG. 1, each of the reservoirs 109, 111 may be fluidically coupled with a respective one of the liquid channels 108 so that each respective solvent A, B may be degassed individually in the degasser 100 before mixing them together in proportioning valve 87.

Moreover, FIG. 2 shows that the degasser 100 comprises a negative pressure chamber 104 in which a negative pressure—compared to the pressure in the liquid accommodation volume 102 and compared to an ambient pressure of for instance 1 bar—can be generated by a negative pressure source 110. The negative pressure chamber 104 may be a vacuum chamber and the negative pressure source 110 may be a vacuum pump configured for evacuating the negative pressure chamber 104 when a fluid valve 152 is open.

A deformable gas permeable membrane 106 separates the liquid accommodation volume 102 from the negative pressure chamber 104, i.e. is arranged in between. Since the gas permeable membrane 106 is permeable for gas but impermeable for liquid, the gas-containing liquid 121 in the liquid accommodation volume 102 contacting the membrane 106 from a bottom side will be separated into a gas-enriched portion propagating through the gas permeable membrane 106 and a gas-depleted portion consisting primarily of liquid and being incapable of traversing membrane 106. This separation is promoted by the vacuum in the negative pressure chamber 104 resulting in vacuum degassing.

In addition and as described below in further detail, the gas-containing liquid 121 can be actuated (i.e. to separate gas bubbles from liquid) and/or the gas permeable membrane 106 can be actuated (i.e. can be forced to move or oscillate), by ultrasound to additionally stimulate or force gas of the gas-containing liquid 121 to move through the membrane 106 by a combinatory effect of the negative pressure and the ultrasound. Without wishing to be bound to a specific theory, it is presently believed that separation of gas particles from liquid in gas-containing liquid 121 can be promoted by subjecting the gas-containing liquid 121 and/or the gas permeable membrane 106 to ultrasound.

In order to enable the synergistic combination of the vacuum-based and ultrasound-enhanced degassing, an ultrasound source 112 may be provided in the degasser 100. Advantageously, the ultrasound source 112 may comprise an electroactive material 124, preferably an electroactive polymer. Hence, the ultrasound source 112 may be configured for generating ultrasound for actuating the gas containing liquid 121 and/or the gas permeable membrane 106 by exciting the electroactive material 124 electrically to force it to deform for generating ultrasound. Preferably, the electroactive material 124 may be an electroactive polymer, such as an electroactive silicone, like fluorosilicone. Advantageously, also the membrane 106 may be made of a silicone such as fluorosilicone, since such a material combines a proper gas permeability with a liquid impermeability, is durable and properly deformable as well as manufacturable with sufficiently small thicknesses, d, of for instance 20 µm (please note that FIG. 2 is not true to scale).

According to the embodiment of FIG. 2, the ultrasound source 112 on the one hand and the gas permeable membrane 106 on the other hand are formed as separate members. More specifically, the ultrasound source 112 is arranged in a wall 116 which delimits the negative pressure chamber 104. During operation of the degasser, an excitation unit 154 may create electric signals (in particular an AC (alternating current) voltage) applied to electrodes (see reference sign 122 in FIG. 4) of the ultrasound source 112. The electric field generated by the electrodes of the ultrasound source 112 excites and thereby deforms the electroactive material 124 of the ultrasound source 112. Consequently, the electroactive polymer is triggered to emit ultrasound waves into the negative pressure chamber 104 and from there to the gas-permeable membrane 106. This also triggers the membrane 106 to oscillate, thereby enhancing the vacuum-based degassing of the gas-containing liquid 121 due to the impact of the ultrasound.

Advantageously, the degasser 100 may further comprise a pressure sensor 118 for sensing a pressure in the negative pressure chamber 104. The sensed pressure data may be supplied from the pressure sensor 118 to a control unit 70 (for instance a processor) controlling operation of the degasser 100. In particular, operation of the negative pressure source 110 and/or of the excitation unit 154 may be adjusted by the control unit 70 based on the detected pressure value.

Highly advantageously, the pressure sensor 118 can be integrally formed with the ultrasound source 112. Depending on the pressure value in the negative pressure chamber 104, the dielectric elastic layer of electroactive material 124 of the ultrasound source 112 will be deformed in a characteristic way. Together with the above-mentioned electrodes, the electroactive material 124 forms a capacitor with a value of the capacitance being characteristically influenced by the deformation of the electroactive material 124, and thereby depending on the pressure value in the negative pressure chamber 104. Hence, electrically measuring the capacitance allows to derive the pressure value in the negative pressure chamber 104 by simultaneously using the ultrasound source 112 as a pressure sensor 118.

As can be taken from FIG. 2 as well, the degasser 100 comprises a support structure 132 as part of its casing 156. As shown, the gas permeable membrane 106 is mounted on the support structure 132 which is configured for maintaining at least a predefined minimum volume of the liquid accommodation volume 102. Thus, it can be prevented that the flow of gas-containing liquid 121 in the liquid accommodation volume 102 is disturbed or blocked by an excessively deforming membrane 106. The embodiment of FIG. 2 comprises a base manifold formed by casing 156 and being provided with the fluid channels 108 and the support structure 132. The latter may be constituted as a knurled or knob-like pattern which keeps the membrane 106 at a minimum distance and prevents the degasser channels 108 from being blocked by membrane 106. The negative pressure chamber 104 is placed under a vacuum which can be measured by the dielectric elastomer of pressure sensor 118.

Advantageously, the dielectric elastomer according to reference sign 124 synergistically functions both as a pressure sensor 118 and for inducing ultrasonic waves in the negative pressure chamber 104, and hence in the membrane 106 and the liquid accommodation volume 102. This leads to an additional ultrasonic degassing of solvents with an integrated feedback sensor 118 within the actuator. This saves space and improves the performance of the degasser 100.

Figure 3:
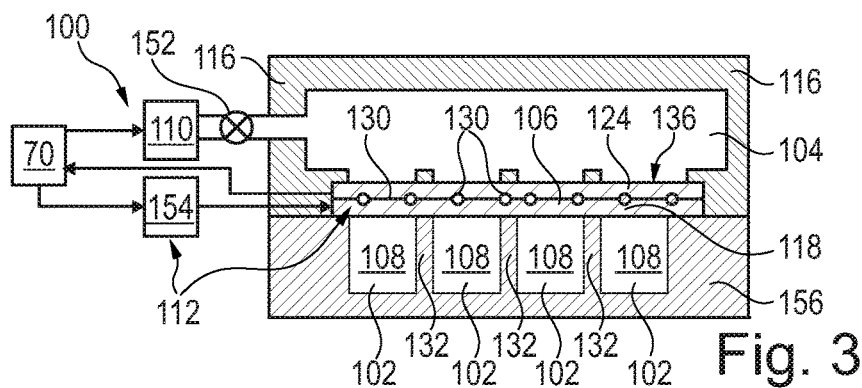
FIG. 3 shows a degasser according to another exemplary embodiment of the invention.
Figure 4:
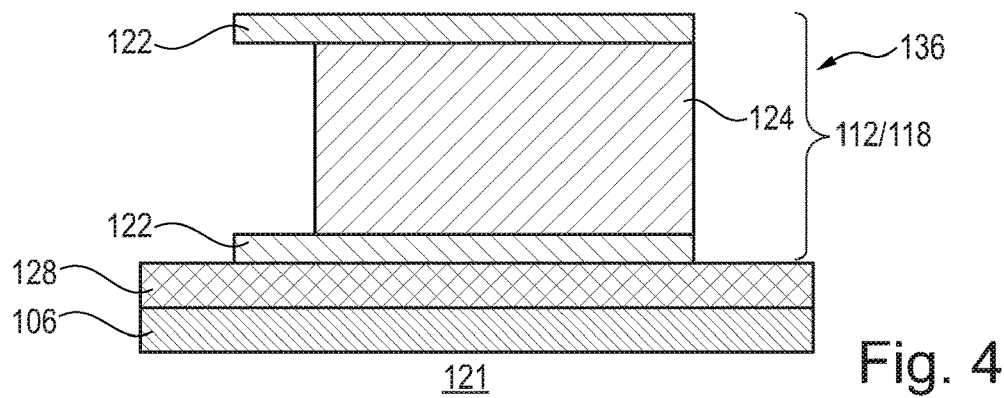
FIG. 4 shows a stack comprising a gas permeable membrane with integrated ultrasound generation and pressure transducing capabilities for the degasser according to FIG. 3.

FIG. 3 shows a degasser 100 according to another exemplary embodiment of the invention. FIG. 4 shows a stack 136 comprising a gas permeable membrane 106 with integrated ultrasound generation and pressure detecting capabilities for the degasser 100 according to FIG. 3.

The embodiment of FIG. 3 and FIG. 4 differs from the embodiment of FIG. 2 in particular in that, according to FIG. 3 and FIG. 4, the ultrasound generation and pressure detection tasks fulfilled by the electroactive material 124 in wall 116 of the degasser 100 according to FIG. 2 are now carried out by a layer stack 136 shown in FIG. 4 and integrating also the membrane 106. Hence, in the embodiment of FIG. 3 and FIG. 4, the stack 136 including the membrane 106 can also be used as a pressure sensor 118 and contributes to the ultrasonic source 112 in combination. Thus, stack 136 not only functions as gas-permeable membrane 106, but also as a multilayer sensor and actuator with the setup illustrated in FIG. 4.

Now referring to FIG. 4, the stack 136 comprises a permeable porous spacer layer 128 on the layer-type gas permeable membrane 106 and below the multi-layer ultrasound source 112. The ultrasound source 112 comprises, in turn, two layer-type electrodes 122 between which a block or layer of electroactive material 124 is arranged. Thus, the stack 136 comprises an actuator and sensor function realized by the electrodes 122 and the electroactive material 124 in between. The gas permeable membrane 106 is covered with a spacer foil in form of spacer layer 128.

More specifically, stack 136 comprises the protective permeable sealing membrane 106, for example made of fluorosilicone. Electroactive material 124 may be a silicone insulation, for example made of fluorosilicone as well. Spacer layer 128 keeps the membrane 106 at a proper distance to the lower electrode 122 so that the lower electrode 122 does not block space for the diffusion process of degassing. For example, the spacer layer 128 can be a flat structure with holes, a grid-like pattern or a porous structure. The composition of stack 136 according to FIG. 4 may allow to achieve significant progress in degassing.

According to FIG. 3, the electroactive material 124 integrated in wall 116 according to FIG. 2 may be dispensable. It may however be implemented in wall 116 in yet another embodiment which is similar as the one shown in FIG. 3, but realizes the function of the pressure sensor 118 or of the ultrasound source 112 in wall 116 rather than in membrane stack 136.

Furthermore and as shown in FIG. 3 as well, the gas permeable membrane 106 may comprise a supporting grid 130 for preventing the membrane 106 from collapsing in the event of an excessive pressure difference between its opposing main surfaces. The membrane 106 may be preferably made of fluorosilicone and may be supported by grid 130 which is placed into the degasser chamber or even in an interior of the elastic membrane material (not shown) in order to protect the membrane 106 and keep it in place. In another embodiment, an even deeper and flat integration can be achieved.

Figure 5:
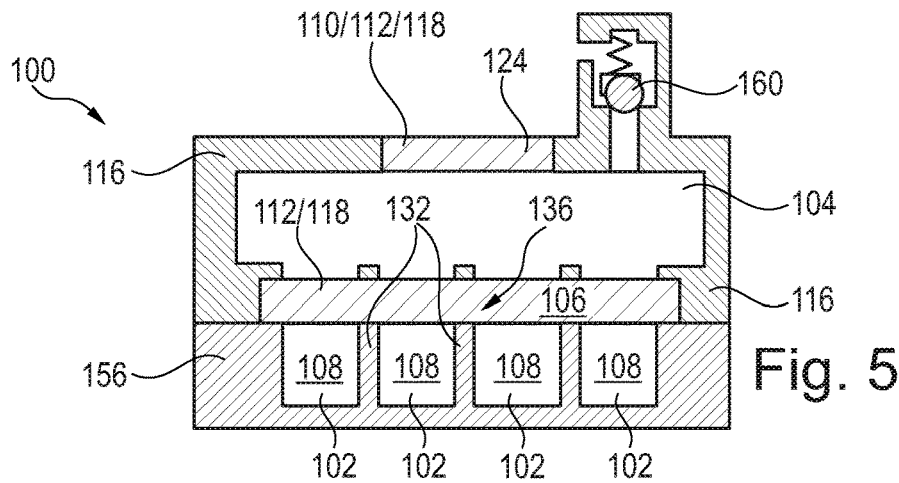
FIG. 5 shows a degasser according to still another exemplary embodiment of the invention.

FIG. 5 shows a degasser 100 according to still another exemplary embodiment of the invention. The embodiment of FIG. 5 is similar to the embodiment of FIG. 3 and FIG. 4. The following description focuses on differences of the embodiment of FIG. 5 in comparison to the embodiment of FIG. 3 and FIG. 4.

According to FIG. 5, the function of the ultrasound source 112 and/or of the pressure source 118 may be implemented in a stack 136 comprising the gas permeable membrane 106, for instance as in FIG. 3 and FIG. 4. However, according to FIG. 5, electroactive material 124 may be integrated in the wall 116. The electroactive material 124 may be functionalized (in particular by the provision of electrodes 122 above and below and by connecting them with excitation unit 154 and/or control unit 70, not shown in FIG. 5) for fulfilling the function of an ultrasound source 112 (for instance as described above), of a pressure sensor 118 (for instance as described above), and/or of a negative pressure source 110. When functioning as a negative pressure source 110, the electroactive material 124 integrated in wall 116 may be configured for generating or at least contributing to the negative pressure in the negative pressure chamber 104. Thus, the electroactive polymer according to reference sign 124 may form part of the negative pressure source 110 arranged in the wall 116 which also delimits the negative pressure chamber 104. When the electroactive material 124 is activated by an electric voltage (for instance created in a similar way as described above referring to FIG. 2 by excitation unit 154), it will be displaced into and out of negative pressure chamber 104, for instance with a stroke of several micrometers. This may create pressure pulses which may be exhausted through a check valve 160, so that the gas corresponding to said pressure pulses is ejected through check valve 160 towards an exhaust. As a result, the pressure in the negative pressure chamber 104 will be reduced. Thus, the actuator according to reference signs 124 and/or 106 can be used in conjunction with valve 160 (for example a flap-valve or check-valve comprising soft materials) to generate the vacuum in negative pressure chamber 104.

Figure 6:
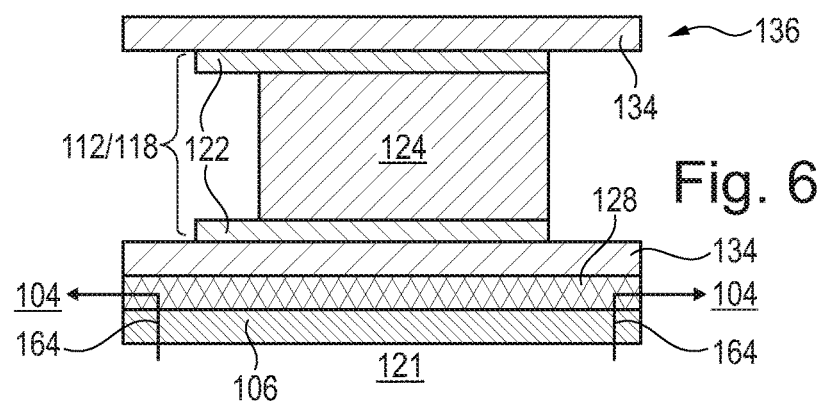
FIG. 6 shows stack comprising a gas permeable membrane with integrated ultrasound generation and pressure sensing capabilities for a degasser according to yet another exemplary embodiment of the invention.

FIG. 6 shows a stack 136 comprising a gas permeable membrane 106 with integrated ultrasound generation and pressure transducing capabilities for a degasser 100 according to yet another exemplary embodiment of the invention.

According to FIG. 6, the ultrasound source 112, the pressure sensor 118 and the gas permeable membrane 106 are formed as an interconnected layer stack 136. Said stack 136 comprises permeable porous spacer layer 128 on the gas permeable membrane 106 and below the combined ultrasound source 112 and pressure sensor 118.

Moreover, the stack 136 according to FIG. 6 comprises a sealing structure 134 sealing the ultrasound source 112 and the pressure sensor 118 both on a top side and on a bottom side. The protective sealing layers forming sealing structure 134 may be made for instance of an inert plastic material such as PEEK or PTFE (e.g., a TEFLON material). The sealing structure 134 may be impermeable, poorly permeable or permeable only to a limited extent for gases and liquids. In order to nevertheless enable an efficient separation of gas from gas-containing liquid 121 through the gas permeable membrane 106 and into the negative pressure chamber 104, preferably enhanced by ultrasound, the negative pressure chamber 104 may be fluidically connected laterally to the gas permeable membrane 106 and the spacer layer 128, as indicated by curved arrows 164. For instance, the negative pressure chamber 104 may then be embodied as delimiting an annular hollow space laterally around the porous spacer layer 128. Advantageously, this may result in an even more compact design of the degasser 100.

Figure 7:
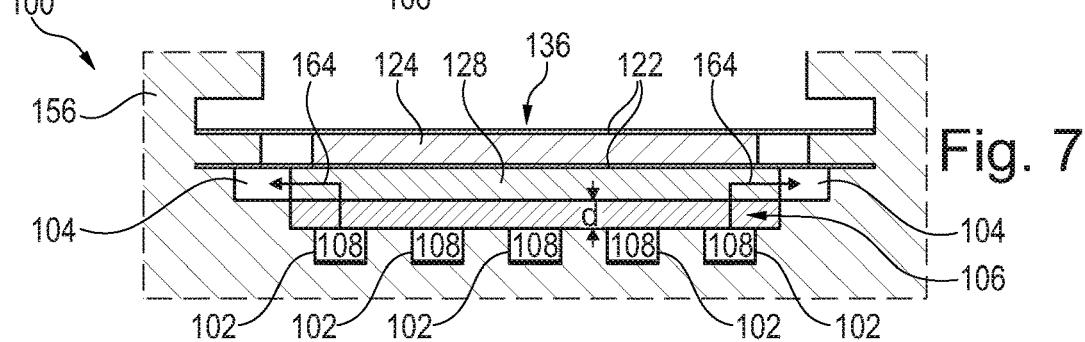
FIG. 7 shows a stack for a degasser according to still another exemplary embodiment of the invention.

FIG. 7 shows a stack 136 mounted in a casing 156 of a degasser 100 according to an exemplary embodiment of the invention.

According to FIG. 7, the electroactive material 124 may be an electroactive polymer, preferably fluorosilicone. Electroactive material 124, together with electrodes 122 on both opposing main surfaces thereof, may function as ultrasound source 112 and/or pressure sensor 118 and/or negative pressure source 110, as described above. For instance, the electrodes 122 may be metal layers, sheets or foils attached to both sides of a block of fluorosilicone.

Advantageously, also the gas permeable membrane 106 may be made of a silicone, preferably fluorosilicone. A thickness, d, of the gas permeable membrane 106 may be in a range from 10 µm to 100 µm. Such a configuration allows to obtain a mechanically robust and nevertheless properly deformable and elastic membrane 106 showing an excellent permeability for gas and a reliable impermeability for liquids. At the same time, said material is durable and compatible even with aggressive chemicals which may occur in liquid chromatography applications.

By configuring the gas permeable membrane 106 and the electroactive material 124 of the same material, preferably fluorosilicone, the number of implemented materials may be low which avoids material incompatibilities and reduces the manufacturing effort of the degasser 100.

Figure 8:
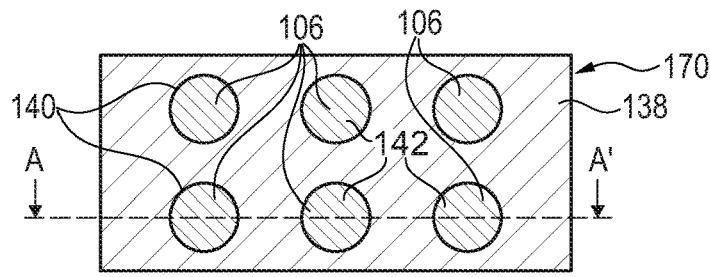
FIG. 8 shows a plan view and a cross-sectional view of a gas permeable membrane with integrated ultrasound generation capability for a degasser according to yet another exemplary embodiment of the invention.
Figure 8:
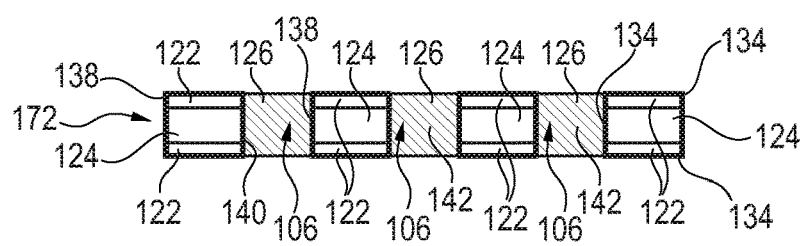

FIG. 8 shows a plan view 170 and a cross-sectional view 172 (along a line A-A') of a gas permeable membrane 106 with integrated ultrasound generation capability for a degasser 100 according to yet another exemplary embodiment of the invention.

According to FIG. 8, the ultrasound source 112 and the gas permeable membrane 106 are formed on the basis of a patterned ultrasonic source sheet 138 having through holes 140 each filled with a respective one of multiple separate sections 142 of gas permeable material. More specifically, the ultrasound source 112 may be formed of a stack comprising a central sheet of electroactive material 124 covered on an upper main surface with a first metal layer (forming an upper electrode 122) and covered on a lower main surface with a second metal layer (forming a lower electrode 122). Thereafter, the obtained three-layer stack may be structured or patterned (for instance by etching, punching, mechanically drilling, laser processing, etc.) for forming the through holes 140. The obtained structure may be coated with a protective layer, which may be a hermetic layer-type sealing structure 134. In other words, the degasser 100 according to FIG. 7 and FIG. 8 comprises a sealing structure 134 sealing the ultrasound source 112 with regard to the gas permeable membrane 106 and being configured as a coating on the ultrasound source 112 at a top side, at a bottom side and laterally, i.e. circumferentially. Thereafter, each through hole 140 may be filled with a separate section of gas permeable and liquid impermeable material 126, to thereby form the multi-islands type membrane 106. The obtained structure is highly compact and shows an excellent performance in terms of vacuum-based degassing, ultrasound-based enhanced degassing, and optionally pressure sensing and/or negative pressure creation.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A degasser for at least partially degassing a gas-containing liquid, the degasser comprising:
    a liquid accommodation volume for accommodating the gas-containing liquid during degassing;
    a negative pressure chamber in which a negative pressure, compared to the liquid accommodation volume, is to be generated;
    a gas permeable membrane separating the liquid accommodation volume from the negative pressure chamber and arranged so that ultrasound forces at least part of gas of the gas-containing liquid to move through the gas permeable membrane by a combination of the negative pressure and the ultrasound; and
    an ultrasound source comprising an electroactive material and configured to generate ultrasound for actuating the gas-containing liquid and the gas permeable membrane, wherein the ultrasound source is integrally formed with the gas permeable membrane.

2. The degasser according to claim 1, wherein the ultrasound source and the gas permeable membrane are formed as a stack.

3. The degasser according to claim 2, wherein the stack comprises a porous spacer layer between the gas permeable membrane and the ultrasound source.

4. The degasser according to claim 1, wherein the ultrasound source and the gas permeable membrane are formed as a patterned ultrasonic source sheet having one or more through holes filled at least partially with one connected or multiple separate sections of gas permeable material.

5. The degasser according to claim 1, comprising a sealing structure sealing the ultrasound source with regard to the gas permeable membrane.

6. The degasser according to claim 1, comprising a negative pressure source configured to generate the negative pressure in the negative pressure chamber.

7. The degasser according to claim 6, wherein the negative pressure source is integrally formed with the ultrasound source in a wall which delimits at least part of the negative pressure chamber.

8. The degasser according to claim 1, comprising a pressure sensor configured to sense a pressure in the negative pressure chamber, wherein the pressure sensor is integrally formed with at least one of the ultrasound source or the gas permeable membrane.

9. The degasser according to claim 1, wherein the ultrasound source comprises electrodes between which the electroactive material is arranged and to which an electric signal is applicable for exciting the electroactive material.

10. The degasser according to claim 9, wherein the electroactive material comprises a dielectric elastomer and forms a capacitor with the electrodes.

11. The degasser according to claim 1, wherein the liquid accommodation volume comprises at least one liquid channel through which the gas-containing liquid is drivable during degassing.

12. The degasser according to claim 1, comprising at least one of the following features:
    wherein the gas permeable membrane comprises a supporting grid;
    comprising a support structure on which the gas permeable membrane is mounted and configured to maintain at least a predefined minimum volume of the liquid accommodation volume;
    wherein the electroactive material is configured to act as a sensor and an actuator simultaneously.

13. A sample separation device for separating a fluidic sample, the sample separation device comprising:
    a pump configured to drive a mobile phase and the fluidic sample when injected in the mobile phase;
    a sample separation unit configured to separate the fluidic sample in the mobile phase; and
    the degasser according to claim 1, wherein the at least partially degassed gas-containing liquid is supplied for creation of the mobile phase.

14. The degasser according to claim 1, wherein the ultrasound source and the gas permeable membrane are mounted in a permanently fixed position relative to the negative pressure chamber.

15. The degasser according to claim 1, wherein the electroactive material is a first electroactive material, and the degasser further comprises at least one of the following features:
    the gas permeable membrane comprises a second electroactive material;
    the gas permeable membrane comprises a second electroactive material having the same composition as the first electroactive material.

16. The degasser according to claim 1, wherein:
    the electroactive material comprises at least one first flat, planar layer;
    the gas permeable membrane comprises at least one second flat, planar layer; and
    the at least one first flat, planar layer mechanically communicates with the at least one second flat, planar layer directly or through one or more additional layers interposed between the at least one first flat, planar layer and the at least one second flat, planar layer.

17. A method of at least partially degassing a gas-containing liquid, the method comprising:
    accommodating the gas-containing liquid in a liquid accommodation volume for degassing;
    generating a negative pressure, compared to the liquid accommodation volume, in a negative pressure chamber; and
    actuating the gas-containing liquid and a gas permeable membrane, which separates the liquid accommodation volume from the negative pressure chamber, by ultrasound generated by an ultrasound source comprising an electroactive material to thereby force at least part of gas of the gas-containing liquid to move through the gas permeable membrane by a combination of the negative pressure and the ultrasound, wherein the ultrasound source is integrally formed with the gas permeable membrane.

18. A degasser for at least partially degassing a gas-containing liquid, the degasser comprising:

a liquid accommodation volume comprising at least one liquid channel through which the gas-containing liquid is drivable during degassing;

a negative pressure chamber in which a negative pressure, compared to the liquid accommodation volume, is to be generated;

a gas permeable membrane separating the liquid accommodation volume from the negative pressure chamber and arranged so that ultrasound forces at least part of gas of the gas-containing liquid to move through the gas permeable membrane by a combination of the negative pressure and the ultrasound;

an ultrasound source comprising an electroactive material and configured to generate ultrasound for actuating the gas-containing liquid and the gas permeable membrane, wherein the ultrasound source is integrally formed with the gas permeable membrane; and a support structure on which the gas permeable membrane is mounted, wherein the support structure at least partially bounds the at least one liquid channel and the gas permeable membrane at least partially bounds the at least one liquid channel.

19. A degasser for at least partially degassing a gas-containing liquid, the degasser comprising:

a liquid accommodation volume for accommodating the gas-containing liquid during degassing;

a negative pressure chamber in which a negative pressure, compared to the liquid accommodation volume, is to be generated;

a gas permeable membrane separating the liquid accommodation volume from the negative pressure chamber and arranged so that ultrasound forces at least part of gas of the gas-containing liquid to move through the gas permeable membrane by a combination of the negative pressure and the ultrasound; and an ultrasound source comprising an electroactive polymer and configured to generate ultrasound for actuating the gas-containing liquid and the gas permeable membrane, wherein the ultrasound source is integrally formed with the gas permeable membrane.

20. The degasser according to claim 19, wherein the electroactive polymer is selected from the group consisting of: silicone; fluorosilicone; fluoroalkylsilicone; fluoro-vinyl-methyl-silicone; methyl silicone; vinyl methyl silicone; phenyl-vinyl-methyl-silicone; poly(3,3,3-trifluoropropyl) methylsiloxane; and phenyl-modified silicone.

* * * * *